US011012536B2

(12) United States Patent
Awad et al.

(10) Patent No.: US 11,012,536 B2
(45) Date of Patent: May 18, 2021

(54) EVENT MANAGEMENT SYSTEM FOR FACILITATING USER INTERACTIONS AT A VENUE

(71) Applicant: Eventbrite, Inc., San Francisco, CA (US)

(72) Inventors: Nadim Awad, San Francisco, CA (US); Steven Elliott Lewandowski, San Francisco, CA (US); Edial W. Dekker, Ilpendam (NL)

(73) Assignee: Eventbrite, Inc., San Francisco, CA (US)

(*) Notice: Subject to any disclaimer, the term of this patent is extended or adjusted under 35 U.S.C. 154(b) by 1076 days.

(21) Appl. No.: 14/829,382

(22) Filed: Aug. 18, 2015

(65) Prior Publication Data

US 2017/0054832 A1    Feb. 23, 2017

(51) Int. Cl.
*G06Q 20/12*    (2012.01)
*H04L 29/06*    (2006.01)
*G06Q 20/04*    (2012.01)

(52) U.S. Cl.
CPC ........... *H04L 67/42* (2013.01); *G06Q 20/045* (2013.01); *G06Q 20/12* (2013.01)

(58) Field of Classification Search
CPC ....... H04W 4/02; H04W 4/021; H04W 4/029; G06Q 30/0261; G06Q 20/12; G06Q 20/327; G06Q 20/045; H04L 67/18; H04L 67/42
See application file for complete search history.

(56) References Cited

U.S. PATENT DOCUMENTS

| | | | |
|---|---|---|---|
| 4,734,564 A | 3/1988 | Boston et al. | |
| 6,473,790 B1 | 10/2002 | Tagi | |
| 7,339,783 B2 | 3/2008 | McEwan | |
| 7,527,195 B2 | 5/2009 | Keithly | |
| 8,215,546 B2 | 7/2012 | Lin | |
| 8,397,984 B1 | 3/2013 | Bascombe | |
| 2002/0103849 A1 | 8/2002 | Smith | |
| 2002/0138357 A1 | 9/2002 | Dutta | |
| 2002/0147638 A1 | 10/2002 | Banerjee et al. | |
| 2004/0030568 A1 | 2/2004 | Kocznar et al. | |
| 2004/0030739 A1 | 2/2004 | Yousefi'zadeh | |
| 2004/0137882 A1 | 7/2004 | Forsyth | |
| 2006/0100922 A1 | 5/2006 | Odemis et al. | |
| 2006/0100985 A1 | 5/2006 | Mark | |
| 2007/0055554 A1 | 8/2007 | Sussman | |
| 2007/0233708 A1 | 10/2007 | Baio | |
| 2007/0276707 A1 | 11/2007 | Collopy | |

(Continued)

*Primary Examiner* — Edward Chang
*Assistant Examiner* — Carol A See
(74) *Attorney, Agent, or Firm* — Dergosits & Noah LLP

(57) ABSTRACT

Methods and systems are disclosed for facilitating customized process flows at an event. A beacon generating device is positioned at the event and is configured to transmit information including a unique identifier associated with the beacon generating device. A user having a mobile communications device running an event management application detects the transmission and sends the detected unique identifier to an event management server. Alternatively, the user's mobile communications device generates and transmits a beacon that is detected by an event organizer device. The event management server returns information to allow the mobile communications device or the event organizer device to run an event-related process.

10 Claims, 9 Drawing Sheets

(56) References Cited

U.S. PATENT DOCUMENTS

| | | |
|---|---|---|
| 2008/0065685 A1 | 3/2008 | Frank |
| 2008/0249836 A1 | 10/2008 | Angell et al. |
| 2009/0088077 A1 | 4/2009 | Brown et al. |
| 2009/0094175 A1 | 4/2009 | Provos |
| 2009/0121016 A1 | 5/2009 | Hammad et al. |
| 2009/0192853 A1 | 7/2009 | Drake |
| 2009/0216571 A1 | 8/2009 | Sunshine |
| 2009/0234659 A1 | 9/2009 | Liao |
| 2009/0326990 A1 | 12/2009 | Ashby et al. |
| 2009/0326993 A1 | 12/2009 | Roth |
| 2010/0063867 A1* | 3/2010 | Proctor, Jr. ........... H04W 4/029 455/414.1 |
| 2010/0070312 A1 | 3/2010 | Hunt |
| 2010/0082491 A1 | 4/2010 | Rosenblatt |
| 2010/0091687 A1 | 4/2010 | Beers |
| 2010/0094791 A1 | 4/2010 | Miltonberger |
| 2010/0203833 A1 | 8/2010 | Dorsey |
| 2010/0219234 A1 | 9/2010 | Forbes |
| 2010/0287368 A1 | 11/2010 | Shuster |
| 2010/0293090 A1 | 11/2010 | Domenikos |
| 2011/0238497 A1 | 9/2011 | Milne |
| 2011/0313870 A1 | 12/2011 | Eicher |
| 2012/0042392 A1 | 2/2012 | Wu |
| 2012/0078667 A1 | 3/2012 | Denker |
| 2012/0197749 A1 | 8/2012 | Gray |
| 2012/0203698 A1 | 8/2012 | Duncan |
| 2012/0252418 A1* | 10/2012 | Kandekar ............... H04W 4/21 455/414.1 |
| 2012/0290336 A1 | 11/2012 | Rosenblatt et al. |
| 2012/0330697 A1 | 12/2012 | Smith |
| 2013/0226704 A1* | 8/2013 | Fernandez ......... G06Q 30/0281 705/14.58 |
| 2013/0290188 A1* | 10/2013 | Olliphant ......... G06Q 20/3223 705/44 |
| 2014/0039945 A1 | 2/2014 | Coady et al. |
| 2014/0365334 A1* | 12/2014 | Hurewitz ........... G06Q 30/0613 705/26.41 |
| 2015/0079942 A1* | 3/2015 | Kostka .................... H04W 4/21 455/411 |

* cited by examiner

EVENT MANAGEMENT SYSTEM FOR FACILITATING USER INTERACTIONS AT A VENUE

TECHNICAL FIELD

This disclosure relates generally to a network-based event management system, and in particular, to the use of beacons at an event to initiate process flows that facilitate the user experience while the user is attending the event.

BACKGROUND

Websites are commonly configured to allow user devices to conduct a wide variety of actions online, such as viewing content, writing reviews, ordering items, purchasing tickets, etc. The website presents the user device with a menu of action choices, and upon user selection, the website typically redirects the user device to a different webpage where the action is completed.

For example, some websites allow users to organize and administer events using an online event management system, such as the Eventbrite event management platform hosted by Eventbrite, Inc., of San Francisco, Calif. (see www.eventbrite.com). An event organizer may use such a system to organize and manage various aspects of an event, such as attendee registrations, ticket sales, event promotion, attendee check-in at the event, etc. An online event management system may also allow customers to view event profiles, register for events, purchase tickets for events, check-in for events, etc.

An event management system may also be utilized to manage event-related tasks conducted at the venue of a scheduled event, such as sales of merchandise, refreshments and other items, event registration and/or ticketing, check-in of registered event attendees, communication with event attendees, etc. However, many problems currently exist in how an event management system is utilized to manage event-related tasks at an event. As an example, customer purchases using credit cards and cash at dedicated point of sale terminals can result in long and slow moving lines. As a further example, checking in to an event using a bar code scanner to scan a physical ticket can result in a slow entry process. As yet another example, the use of a near-field communication (NFC) system would provide a faster check in process and an improved purchase experience at an event, but NFC communications require close proximity and specialized equipment that may not be available to a large amount of event attendees. As a further example, the use of a radio-frequency identification (RFID) system may also provide a faster check in process and an improved purchase experience at the event, but an RFID system requires the shipping and fulfillment of specialized bracelets to event attendees prior to an event.

Thus, it would be desirable to continue to expand the number of features that can be provided by the event management system at the event to further enhance the experience of both event attendees and event organizers. Further, such enhancement could provide a faster check in procedure at the event, quick and easy purchases at the event, and delivery of relevant information and more flexibility as to where and how these experiences are delivered to event attendees.

DETAILED DESCRIPTION

1. Overview

An event management system is disclosed that utilizes one or more beacon generating devices at an event in order to initiate process flows for specific event-related tasks. Each beacon generating device is configured to periodically and repeatedly transmit the same information, namely, a unique identifier ("UID") that is associated with the specific beacon generating device.

In one embodiment, a user's mobile communications device can be configured to listen for specific UIDs and other transmissions being broadcast by a beacon generating device. Upon detecting a UID from a beacon generating device that is transmitting its UID at an event, the user device sends the detected UID to the event management server. The server looks up the UID and returns a specific event-related process flow associated with the UID to the user device and/or the beacon device and/or an event organizer device located at the event. As an example, a process flow may be delivered to the user device to enable the user to check in to the event or to complete a purchase at the event or to receive information or communications related to the event.

In another embodiment, the user's mobile communications device can also be configured to broadcast its own UID, i.e., to act as a beacon generating device. When the beacon of the user device is within range of a beacon device or any other adequately configured computer device at the event, the event management system can perform a number of context specific actions. As an example, upon the user approaching a gate at the event, the event management system could detect and recognize the broadcast UID of the user device as being registered or ticketed for the event, and run a process to check in the user as being in attendance at the event, or further, to run a process to admit the user to the event if he has a valid ticket or registration. As a further example, upon approaching the event, or a point of sale location at the event, the event management system could run a process to perform a purchase transaction for a ticket to the event or for other goods and services, with the user's purchase credentials stored on the event management system and linked to the specific UID that is being transmitted by the user device.

2. System Architecture

Figure 1:
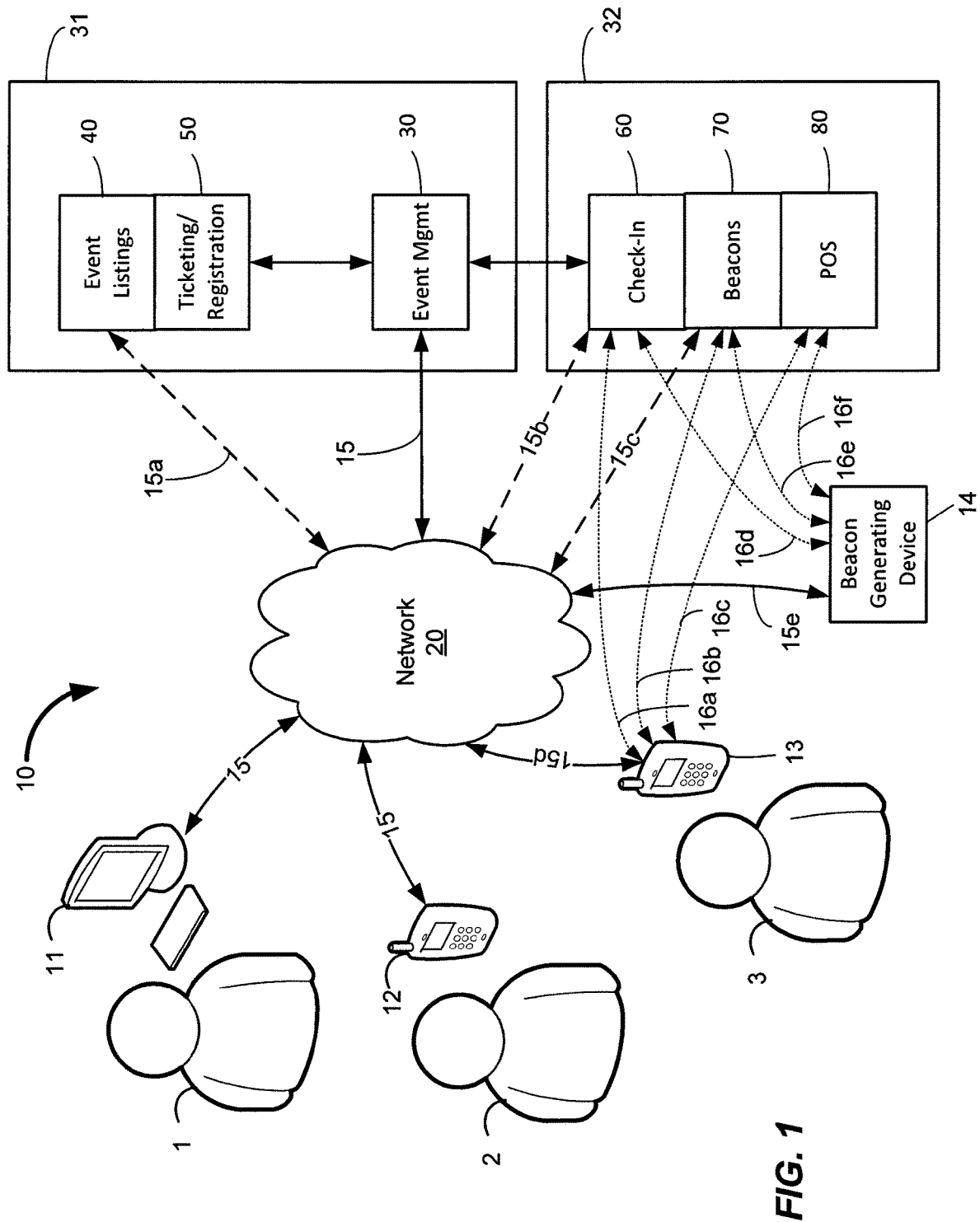
FIG. 1 is a block diagram illustrating an event management system.

FIG. 1 illustrates an embodiment of an event management system 10. System 10 includes a first user 1 having a client system 11, a second user 2 having a client system 12, a third user 3 having a client system 13, and a beacon device 14. The client systems 11, 12, 13 and the beacon device 14 can be used to access and interact with an event management application 30 hosted on a cloud-based server 31 via network 20. For example, the first user 1 is an event organizer using the event management application 30 to create and manage a specific event, while the second user 2 is a customer using the event management system to view upcoming events, and possibly to register for and/or purchase tickets to attend an event. The third user 3 is a customer attending an event, and the beacon device 14 is located at the event being attended by the third user 3.

In one embodiment, the cloud-based server 31 is a network-addressable computing system hosting a web service that runs the event-management application 30 as a tool for users to organize and manage events. The event-management application 30 can include a number of different functional modules which may be an integral part of the event-management application, or which may stand alone as discrete and separate related program modules that are integrated as part of an event management system or process. For example, the event-management application 30 can include or integrate a number of functional modules to provide a variety of different features, such as: (i) an event listing module 40 that maintains a listing of events, information regarding the events, and links to related web pages; (ii) a ticket/registration module 50 that allows customers to purchase tickets and/or register for specific events; (iii) a check-in module 60 that allows customers that have purchased tickets or registered for an event to check-in at the event; (iv) a beacon module 70 that interacts with dedicated beacon devices and/or user devices and/or event organizer devices in order to provide process flows for delivery to user devices of registered and/or ticketed customers attending the event, or to one or more event organizer devices operated by the event organizer, or to one or more beacon devices configured at the event and (v) a point of sale module 80 that allows customers to purchase tickets, registrations, merchandise and concessions at an event. Other functions could also be configured as part of the event management application.

The event-management application 30 may generate, store, receive, or transmit event-related data, for example, event listings, event information details, event history details, event registration details, event organizer details, event attendee details, ticket purchase details, attendee check-in details, event displays, sponsors, etc. Users may access, send data to, and receive data from the event-management application 30 using client systems, such as client systems 11, 12, 13, which may be any suitable computing device, for example, a personal computer, a laptop, a tablet, a cellular phone, a smartphone, a personal digital assistant, etc.

Network 20 may be any suitable communications network. For example, one or more portions of network 20 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another suitable network, or a combination of any of these.

The client systems 11, 12, 13 and event-management application 30 are connected to network 20 (or to each other in alternative embodiments) by connections 15. In some embodiments, the client systems 11, 12, 13 may communicate directly with the functional modules of the event management application 30 for a specific purpose. For example, connection 15a allows direct communication with the event listings module 40, which may be embodied as a discrete and separate web page; connection 15b allows direct communication with the check in module 60, which may be embodied as a separate and distinct computing system operated at the event; and connection 15c allows direct communication with the beacon module 70.

The connections 15, 15a, 15b, 15c may include one or more wireline connections, such as Digital Subscriber Line (DSL) or Data Over Cable Service Interface Specification (DOCSIS); wireless connections, such as Wi-Fi or Worldwide Interoperability for Microwave Access (WiMAX); or optical connections, such as Synchronous Optical Network (SONET) or Synchronous Digital Hierarchy (SDH). One or more connections 15, 15a, 15b, 15c may include an ad hoc network, an intranet, an extranet, a VPN, a LAN, a WLAN, a WAN, a WWAN, a MAN, a portion of the Internet, a portion of the PSTN, a cellular telephone network, another suitable connection, or a combination of any such connections.

In one embodiment, the check-in module 60, the beacon module 70 and the point of sale module 80 may be configured as separate and distinct computer-based devices located at an event, or they may be integrated with an event organizer device 32 at the event. Thus, user 3 may be able to communicate directly with the check-in module 60 via connection 16a, directly with the beacon module 70 via connection 16b, and directly with the point of sale module via connection 16c, or indirectly with any of these modules via connection 15d and the network 20. Similarly, the beacon device 14 may be able to communicate directly with the check-in module 60 via connection 16d, directly with the beacon module 70 via connection 16e, directly with the point of sale module via connection 16f, or indirectly with any of these modules via connection 15e and the network 20. The connections 16a-f may implement a local communications protocol, such as Bluetooth LE or Wi-Fi.

3. Event Management Generally

A web-based software application for event-management, such as the Eventbrite event management platform, allows a user to create, organize and manage events. The event may be a party, a concert, a conference, a sporting event, a fundraiser, a networking event, or a live performance, for example. Events may occur online (such as a web-based seminar) and offline (such as a live seminar in a lecture hall). An offline event may take place at or in a stadium, a hall, an auditorium, a hotel, a camp site, a beach, a standing area, a general admission area, or any suitable outdoor and indoor locations.

As noted above, the first user 1 of the event management application may act as an event organizer and, as a starting point, create an event profile for one or more events and input information associated with the event to the event listings module 40 of the event management application. The event profile may be accessed by other users on one or more web pages or other content sources maintained, for example, in the event listing module 40 and served through the event-management application 30. The second user 2 of the event management application may be interested in attending an event and use the event-management system, for example, by accessing one or more web pages maintained by the event listing module 40, to get information about the event, and then register and/or purchase tickets for the event, for example, by being redirected to the ticketing/registration module 50. The third user 3 may use the event management system while at the event location for various specific event-related tasks, for example, to register or purchase tickets for the event, or to check in to the event, to purchase food or merchandise at the event, etc.

The event management system may maintain event profiles for a large number of events at a large number of different venues. The event profiles may be managed by the event listing module 40 and accessed via network 20 by any suitable client system either directly via connection 15*a*, or via the event management application 30.

An event profile may include event information related to and describing the event, included but not limited to, the event title, the event date/time, the event category or type, the event details, a description of the event, the event cost or ticket price for the event, the event organizer, the event promoter, the geographic location of the event, the venue for the event, a seat map for the event, the capacity for the event venue, the performer(s) for the event, the number of tickets available for the event, the type/class of tickets available for the event, the ticket identifiers, the number of reserved seats available for the event, the location/type/class of reserved seats available for the event, the selling prices of the reserved seats for the event, the selling order of the reserved seats for the event, the registered event attendees, the check-in status of each event attendee, the ticket-selling window (such as a start time and an end time during which tickets can be sold), purchase information for the event, an attendee list for the event, references to additional information (such as, for example, hypertext links to resources related to or describing the event, historical sales data for the seats of the events, and the like), privacy settings for the event profile, or other suitable event information.

The event profile may also include a total number and type of tickets that are available for the event, and a link to purchase tickets or to register for an event, for example, a link to the ticketing/registration module 50. The type of tickets available for an event may include, for example, premium tickets, general admission tickets, reserved seat tickets, another suitable type or class of tickets, or two or more such types of tickets. The number of tickets available for an event may be based on a specified number, or the size or capacity of the event venue, or other relevant factors.

The event profile may include reserved seat information for the event. The reserved seat information may include, for example, seating arrangements for the event at the specified location, the total number of reserved seats for sale by the event organizer for each seating arrangement, the location or position of each reserved seat with reference to each seating arrangement, the location or position of each door with reference to each seating arrangement, the location or position of each wheelchair seat with reference to each seating arrangement, the type or class of each reserved seats, an estimated selling price for each reserved seat, a selling order for each reserved seat, or other suitable reserved seats information.

The event management system may include additional software tools to enable a user to promote and manage events. For example, software tools can provide features such as delivering event information to users via email, push notification, text or messaging, including sending personalized invitations to pre-determined contacts, listing non-private events on search engine or in public directories, or promoting events to friends via social networks such as Facebook, Twitter, or Linkedin. The event management system may enable the event organizer to track attendance, including but not limited to, emailing attendees and sending event reminders regarding tickets, seating and/or other event information, managing group registration, sending professional invitations, viewing ticket sales and/or registration information, determining the number of attendees, estimating the total revenue from sales of the reserved seats, tracking the sale of each reserved seat, accessing sales data at any time, scanning tickets, and managing discounts, group and members-only registration.

4. On-Site Event Management

Figure 2:
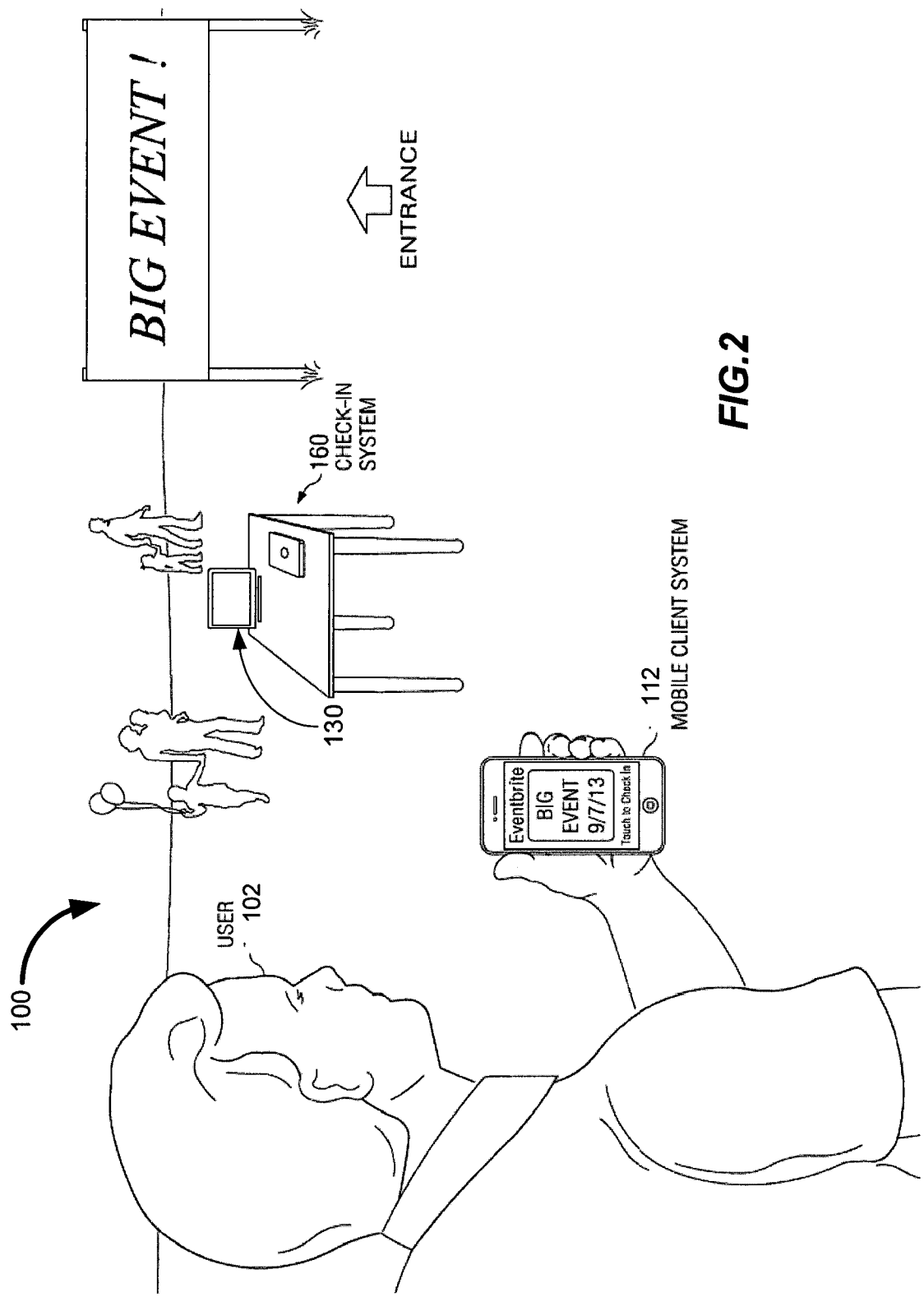
FIG. 2 is an illustration of a check-in system at an event.

FIG. 2 illustrates an embodiment of an event management system 100 located at an event that includes an event organizer device 130 configured with at least a client component of the event management application 30. The event organizer device 130 includes an event check-in system 160 located at the event. The event organizer device 130 can be a stand-alone computer-based system, including a personal computer, a laptop, a tablet, a cellular phone, a smartphone, a personal digital assistant, etc., located at the site of the event, but may also be connected to the event management server 31. The event check in system 160 may also be a stand-alone computing device, or it may be an integrated component of the event organizer device 130. A list of attendees (registered and/or ticketed) for the event is stored in the event management system and can be retrieved and used as necessary by the event organizer device 130 and the check-in system 160 in order to perform event-related routines for the attendees at the event. Other information may also be stored and associated with each attendee, such as a user profile of the attendee, electronic payment methods, etc.

The attendee list can indicate the status for each attendee registered for the event, i.e., has an attendee checked-in at the event or not. The check-in system 160 can be configured in different ways to receive an indication that the attendee has arrived at an event. For example, the check-in system 160 can be used to access the event attendee list, either by an event staff person or the attendee himself, and select the attendee from the list to indicate that the attendee has arrived. The check-in system 160 may be configured to allow a search for the event attendees by name, email address, ticket identifier, etc., and then select the attendee from the list.

The check-in system 160 may also be configured to scan a ticket for a ticket identifier and to identify the attendee based on the ticket identifier. The ticket identifier may be a barcode, a 2D barcode, a QR code, or another suitable scannable identifier. The ticket identifier may be scanned using any suitable scanning device, such as, for example a camera, an optical scanner, a barcode scanner, a QR code scanner.

As another example, an attendee may transmit a message or signal, such as an email, text message, radio frequency identification tag, Bluetooth UID, Bluetooth MAC Address, other suitable message or signal, or any combination thereof, to the check-in system 160, the message or signal containing the attendee's name, email address, or ticket identifier. The check-in system 160 receives the message or signal and automatically provides an indication that the attendee has arrived and checked-in. When the attendee exits the event or otherwise leaves the event, the attendee may have his ticket scanned upon exit, or may used the check-in system 160 to provide an indication that he is leaving the event.

Systems and methods for checking-in attendees to an event are further described in U.S. Pat. No. 8,397,984 entitled System for On-site Management of an Event, and U.S. Patent Publication No. 2014/0039945 entitled Customized Check-In for Event Ticket Network Systems, both of which are completely incorporated herein by reference.

As shown in FIG. 2, the user 102 checks-in to the event using a mobile client device 112 and a check-in system 160 with the event organizer device 130 configured as a wireless access terminal. The mobile client device 112 accesses and/or stores an electronic ticket that is transmitted to the check-in system 160 via a wireless link. The check-in system 160 verifies whether the electronic ticket is valid and, if so, updates the status of the attendee to indicate that the attendee has checked-in.

The check-in system 160 with wireless access terminal 130 may be configured, for example, using a near-field communication (NFC) system, a radio-frequency identification (RFID) system, another suitable system, or any combination thereof. An NFC interface allows for close-range communication, and may comply with various standards, such as, for example, ISO/IEC 18092, ECMA-340, ISO/IEC 21481, ECMA-352, ISO 14443, ISO 15693, other suitable standards, or any combination thereof. However, the NFC interface has a very limited range of approximately 2-4 cm.

The use of beacon devices at an event can facilitate a more efficient flow of information between the user and the event management system at greater distances than that of NFC or RFID schemes. The use of beacon devices to periodically and repeatedly transmit information using wireless communication protocols is generally known. A beacon generating device generates its information in a compact format and transmits the information periodically within its range using, for example, the Bluetooth Low Energy protocol or the iBeacon protocol. In one embodiment, a standard advertising beacon is configured to periodically transmit a unique identifier ("UID"), e.g., a numeric or alphanumeric string that is uniquely associated with the advertising beacon. The UID is typically used to address or reference the beacon device, and may be a MAC address, a Bluetooth UUID, or any other identifier scheme including a custom address. The transmission of the beacon UID is received by any mobile communication devices (e.g., smartphone) located within range of the beacon, typically about 50 meters.

In one embodiment, one or more beacon devices can be deployed at an event and configured to transmit information or to receive information that is used to initiate and perform specific event-related process flows. The use of beacons makes the event-related processes more efficient and user friendly. In one example, referring to FIG. 2, the check-in system 160 at the event may be configured to generate and transmit a beacon. The mobile client device 112 detects the transmission of information from the beacon and sends the information received, such as a UID, to the event management application 30 on the server 31 via network 20. The event management system 30 then searches for the received information on the event management application or in data storage accessible to the server. If it finds a match, the event management system initiates a specific process flow or action associated with the matched information, which usually results in information, such as data, content, or code for a specific event-related process flow, being provided from the event management server 31 back to the mobile client device 112, or to the event organizer device 130. The user 102 then performs the specific process flow or action using the mobile client device 112, for example, by swiping the client device to check in to the event, which then interacts with the check in device 160 and/or the event organizer device 130 via the event management application 30 on the server 31 via network 20 using a Bluetooth wireless link, or directly with check in device 160 and/or the event organizer device 130.

The completion of the process flow on the mobile client device 112 causes data and/or instructions to be sent to event management system 30 via the network 20. The event management system 30 then sends further instructions back to the check in device 160, or the event organizer device 130, to complete the event process flow, for example, acknowledging the user check-in, and updating the attendee list on the server.

Typically, the mobile client device 112 has at least a client component of the event management application installed. The operating system of the mobile client device 112 can be configured to listen for a list of specific signals, such as one or more UIDs related to an event that the user has registered or purchased tickets for using the event management system. Alternatively, the operating system of the mobile client device 112 can be configured to listen for any and all signals that are broadcast within range of the device, and then look for those signals on the event management system using specified search criteria, such as geolocation data, registration purchase history, etc. When a listed UID or other signal is detected, an action may be specified, as further discussed below.

For example, when a client component of the event management application is installed on the mobile client device 112, the user may register various UIDs that should be listened for. The ability to specify and listen for specific transmissions is a standard feature of most operating systems, including the Apple iOS. Further, such a configuration is usually run in the background, and the application need not be open or running. When a listed UID is detected, an action may be specified, for example, wake up the device, start the event management application, and send the detected UID to the event management server 31.

Figure 3:
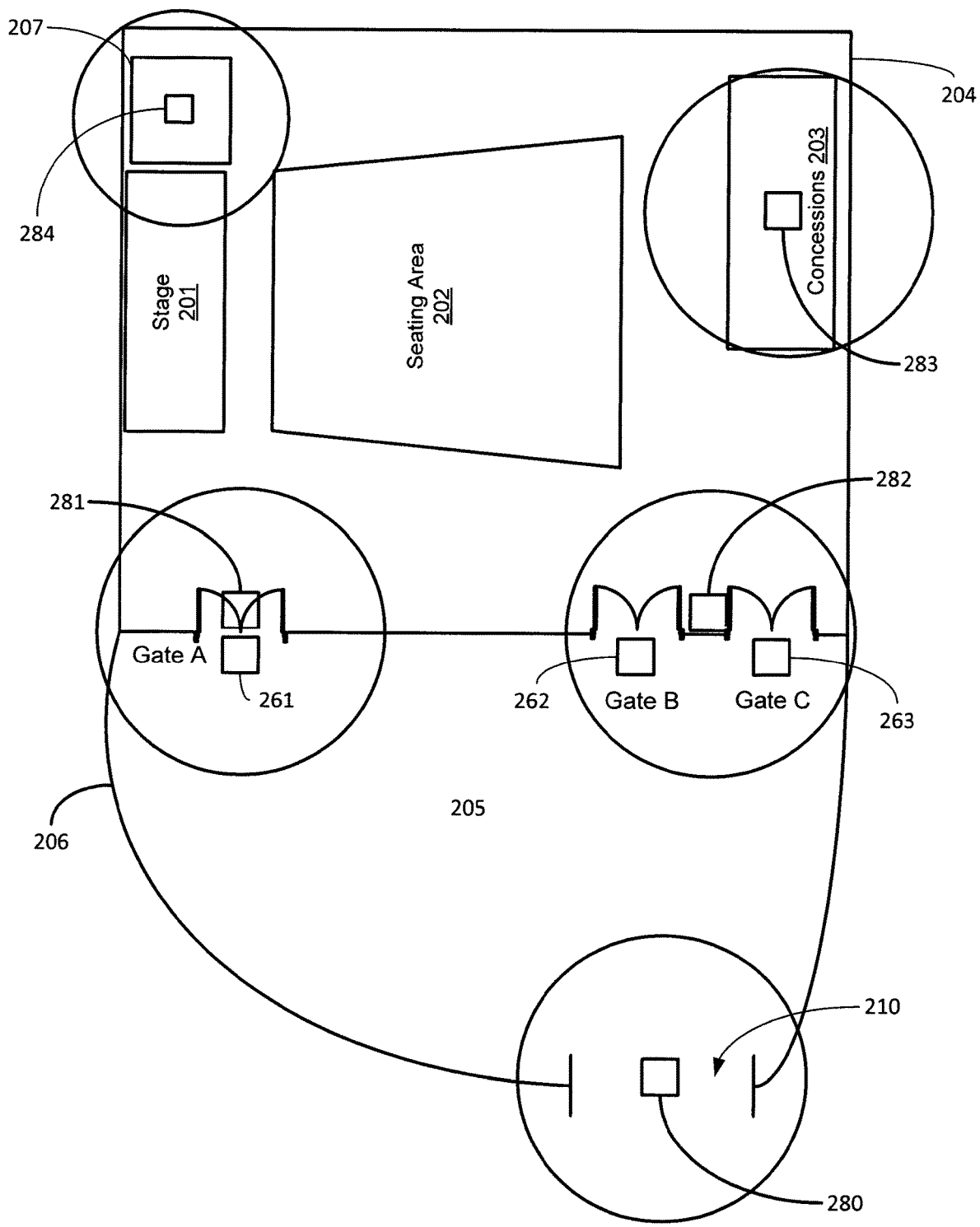
FIG. 3 is a schematic diagram of a system configuration for an event illustrating the deployment of beacons and check-in devices at an event.

One example of the use of beacons is illustrated in FIG. 3. An event location 200 is shown that includes a stage 201, a seating area 202, and a concessions area 203, all located within a perimeter fence 204. An entrance area 205 is located outside the perimeter fence 204 but within its own perimeter fence 206. The entrance area 205 is configured to funnel guests arriving at the main gate 210 to one of three entrances: gate A with check-in system 261; gate B with check-in system 262; and gate C with check-in system 263.

A number of beacon generating transmitters are distributed around the event location 200. For example, a first beacon 280 is located at the inlet to the entrance area 205. The first beacon is configured to transmit a first UID that will be received by any mobile client system that is within range of the first beacon, i.e., any device that is entering the entrance area 205. A user device that includes at least a client component of the event management application and that has purchased a ticket to the event using the event management application will recognize the first UID and send the first UID to the event management server. The server will return information to the user device, such as program instructions and/or data for a first event-related process flow specifically associated with the first UID. In this example, the flow associated with the first UID may be instructions for guests as to which gate they should use to enter the seating area. Such an instruction could be customized for the particular use based on, for example, a ticket identifier that is associated with that user for that event. Thus, guests with seats nearer the stage at the front of the seating area may be directed to gate A; guests with seats in the rear of the seating area may be directed to gate B; guests with seats in the balcony may be directed to gate C.

Figure 4:
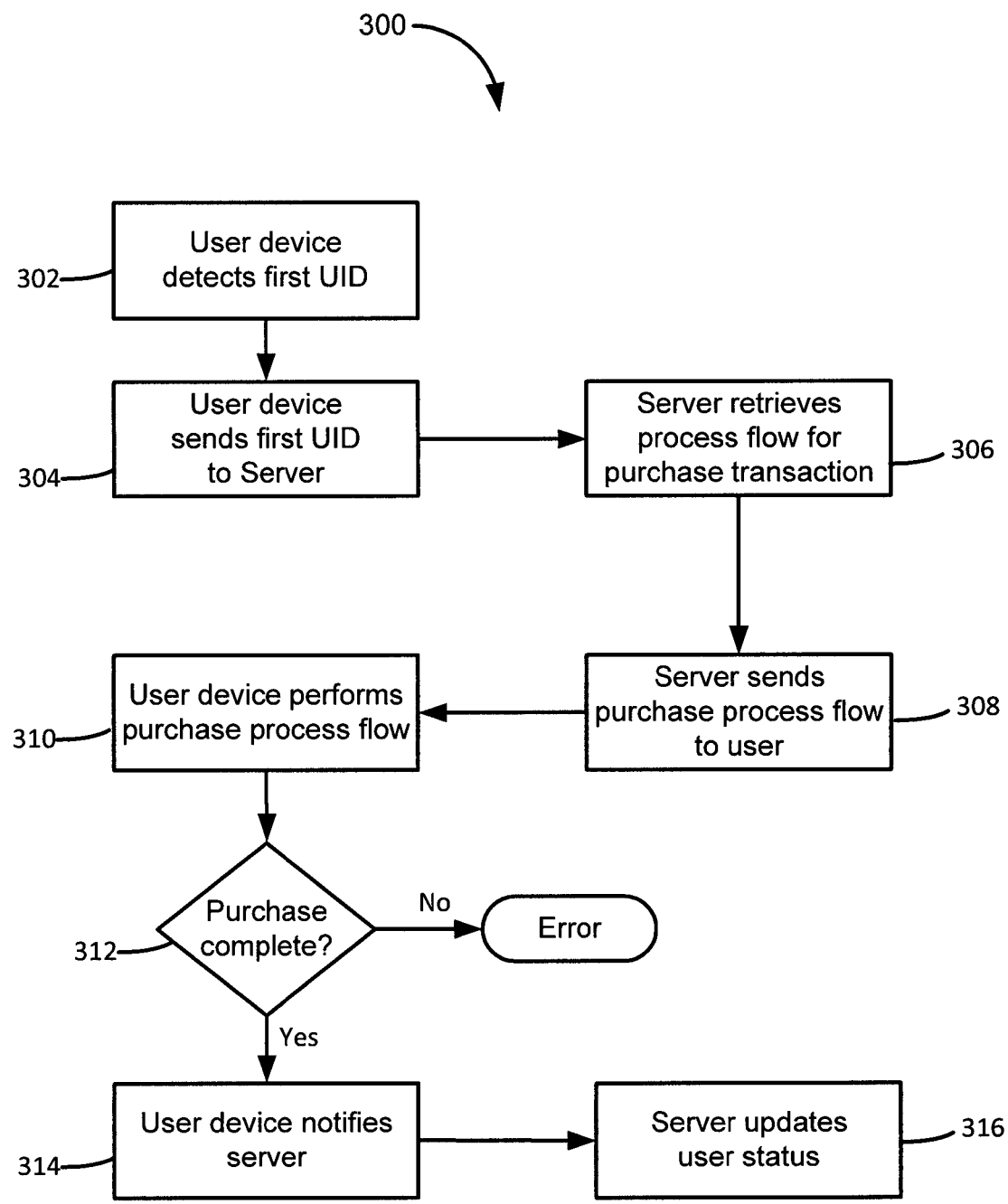
FIG. 4 is a flow diagram illustrating a process for detecting and acting on a unique identifier generated by a beacon device and detected by a user device.

An alternative process flow 300, illustrated in FIG. 4, may provide the opportunity to purchase a ticket for the event. For example, if the user is at the event but without a ticket, in step 302, the user device detects the transmission of the first UID from beacon 280. In step 304, the user device sends the first UID to the event management server. In step 306, the server retrieves a process flow associated with the first UID from storage, such as program instructions regarding the purchase of tickets. In step 308, the server returns the purchase instructions to the user device. For example, the server may provide a link to a web page dedicated to purchase transactions for the event. In step 310, the user device performs the process flow for the purchase transaction, which may include interaction with the server 31 or a third party payment service. In one embodiment, performing the process flow causes the user device to be redirected to the web page for purchase transactions, where the user can initiate and complete the purchase transaction.

Once the purchase transaction is complete in step 312, the user device notifies the server in step 314. In step 316, the server updates the status of the user for that event.

If the user device has already installed the client component of event management application, the user can also configure payment credentials that are associated with the user account in the event management application. For example, the event management application may have a "wallet" tool that is associated with the user account and configured with payment credentials for any purchase transaction initiated by the user. Alternatively, the event management application may be linked by the user to a third party payment authorization method, such as Apple Pay or Google Wallet.

Further, for such purchase transactions, an additional security layer may be provided as part of the purchase transaction process flow. For example, the process flow for a purchase transaction may require the user to enter a security code to complete the transaction, such as the last four digits of the payment credit card associated with the account, a confirmation code emailed or messaged to the user, or other similar security feature.

Figure 5:
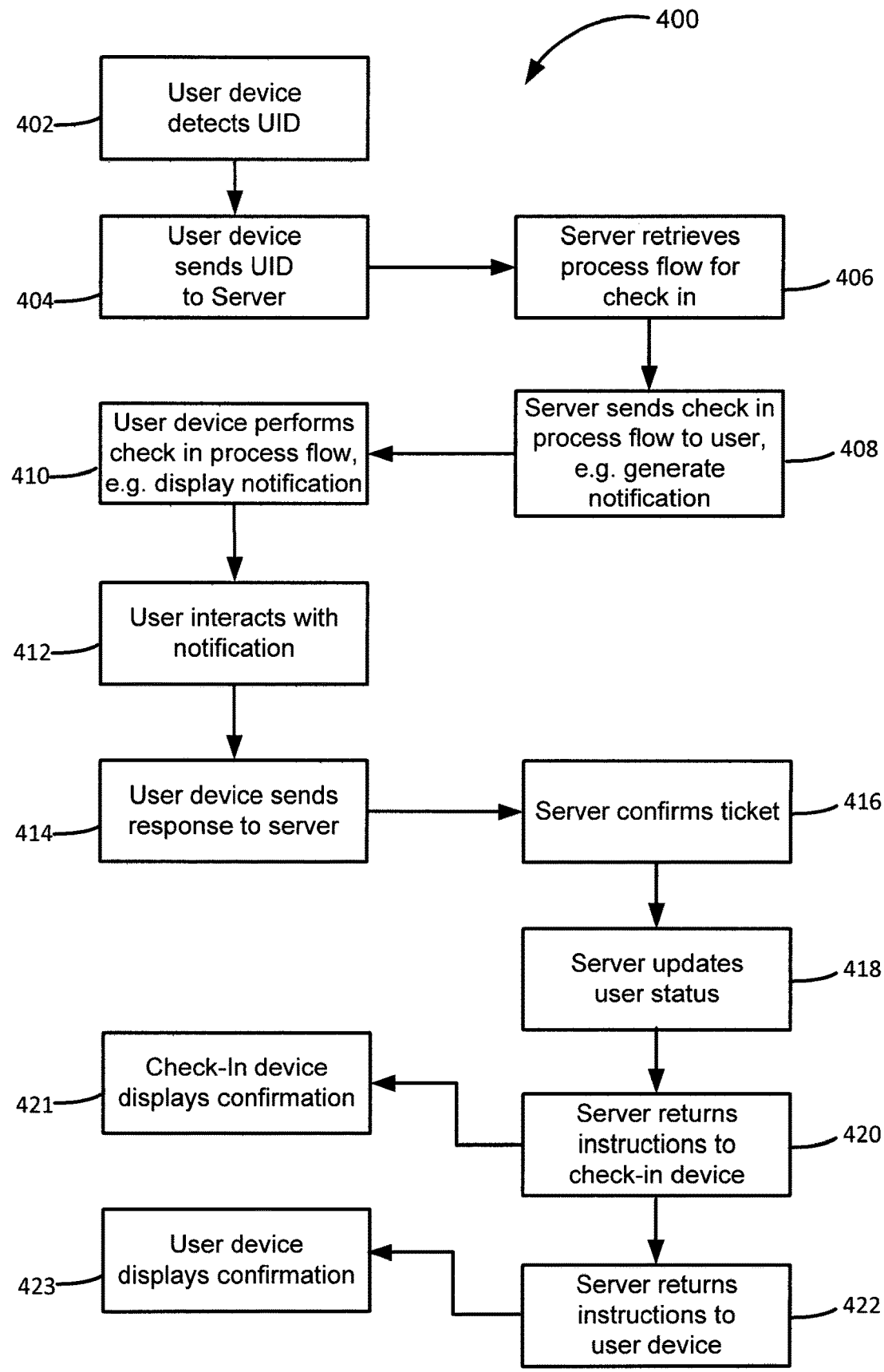
FIG. 5 is a flow diagram illustrating a process for checking a user into an event with a user device.

Referring back to FIG. 3, a second beacon 281 is located at gate A, and a third beacon 282 is located at gates B and C. The second beacon 281 is configured to transmit a second UID, and the third beacon 282 is configured to transmit a third UID. At the entry gates A, B and C, a process flow for admitting and checking in users with a valid registration or ticket can be performed. For example, as illustrated in FIG. 5, in step 402, the user device detects the transmission of either the second or third UID from beacon 281 or beacon 282, respectively. In step 404, the user device sends the detected UID to the event management server. In step 406, the server retrieves a process flow associated with the detected UID from storage, such as program instructions regarding check-in to the event. In step 408, the server returns the check-in instructions to the user device. For example, the server may provide instructions to issue a notification to the user device, such as "You have arrived at the Event. Swipe to check in" In step 410, the user device performs the instructions for the check-in process flow, for example, by displaying the notification on the user device. In step 412, the user interacts with or responds to the notification displayed on the user device in order to proceed with the check-in process. In step 414, in response to the user interaction, the user device sends instructions back to the server to proceed with the check-in process. In step 416, the server confirms that the user has a valid ticket for the event. In step 418, the server updates the user status for the event to indicate that the user has been admitted or checked-in to the event. In step 420, the server returns instructions to the check-in device 160, for example, confirming that the user has a valid ticket and should be admitted, and in step 421, the check-in device displays a message, e.g., confirming a successful check-in. In step 422, the server returns instructions to the user device, for example, to display a message in step 423 confirming a successful check-in.

A fourth beacon 283 is located in the concessions area. The fourth beacon 283 is configured to transmit a fourth UID, which is sent by the user device to the server to initiate a fourth flow associated with the fourth UID. For example, customized content can be sent to user devices, such as coupons for drinks or merchandise in the concessions area.

Figure 6:
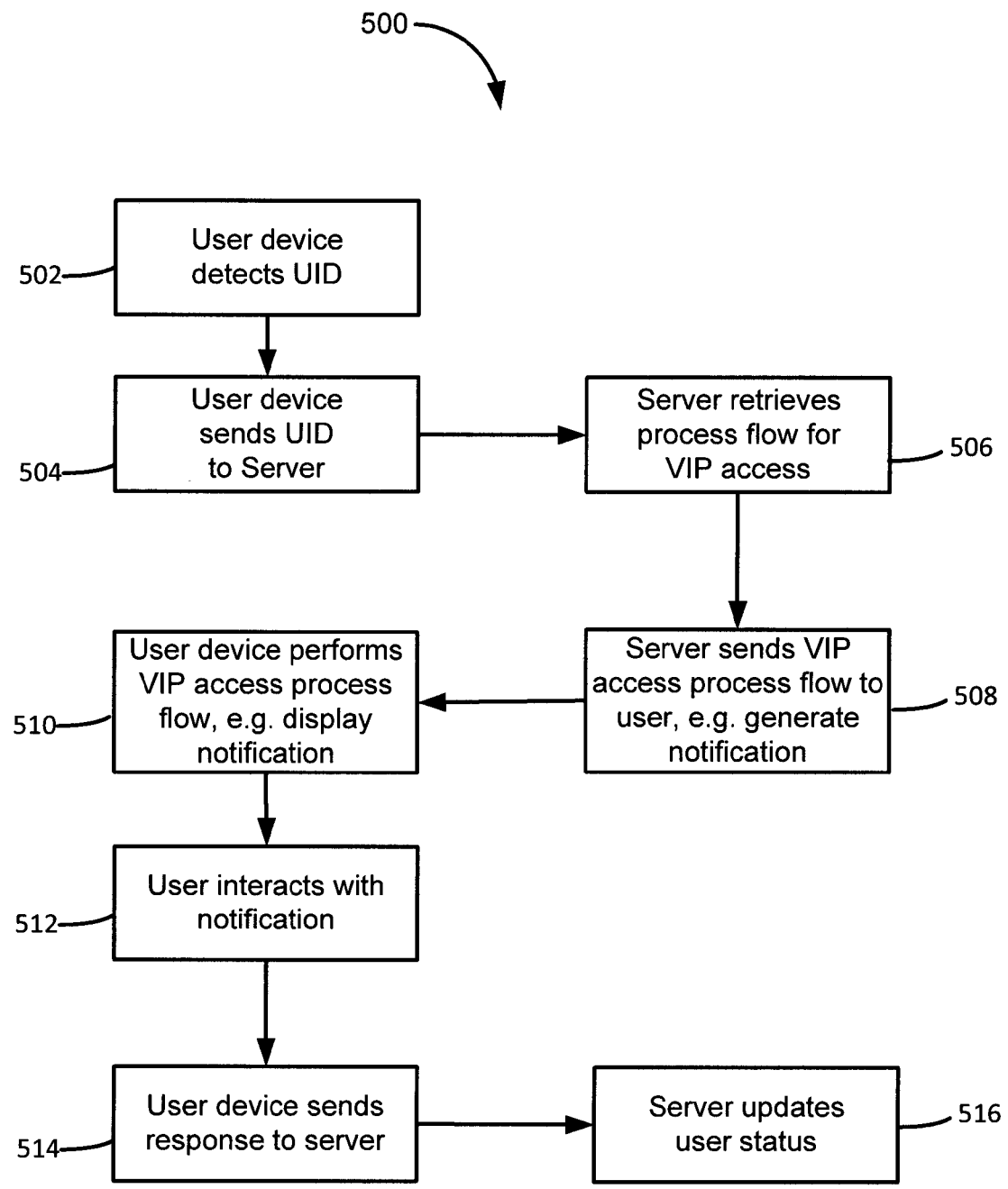
FIG. 6 is a flow diagram illustrating a process for granting access to a user for a restricted area at an event.

A fifth beacon 284 is located at a designated VIP area 207 near the stage 201. For example, the VIP area 207 may be backstage or a dedicated room or tent next to the stage requiring special access privileges. The fifth beacon 284 is configured to transmit a fifth UID, which is detected and sent by the user device to the server to initiate a fifth flow associated with the fifth UID. For example, FIG. 6 illustrates a process flow 500 for granting access to the VIP area 207. In step 502, the user device detects the transmission of the fifth UID from beacon 284. In step 504, the user device sends the detected UID to the server. In step 506, the server retrieves a process flow associated with the detected UID from storage, such as program instructions regarding access to the VIP area 207. In step 508, the server returns the VIP access instructions to the user device. For example, the server may provide instructions to generate a notification to the user device regarding the status of the user vis a vis access to the VIP area 207. The access privilege may be indicated by a particular class of ticket, e.g., a premium ticket having an extra charge for the access privilege, or any other suitable scheme to provide restricted access. For example, in step 510, the instructions sent to the user device may include the user's ticket status and cause a notification to be displayed on the user device such as "You may enter the VIP area. Slide to display authorization," or alternatively, "You do not have access to the VIP area." In step 512, the user interacts with or responds to the displayed notification, for example, by sliding the notification to reveal the VIP access authorization, or additional options. In step 514, the user device sends instructions back to the server confirming that the user has revealed and used the VIP authorization to enter the VIP area 207. In step 516, the server updates the user status for the event to indicate that the user has been admitted to the VIP area 207.

In one embodiment, the beacon device can be integrated with a component of the event management system, for example, the check-in systems, point of sale systems, informational systems, etc., but the beacon device could also be a stand-alone device.

In general, any computer-based device can be configured to transmit a beacon signal and/or listen for a beacon signal. Thus, in an alternative embodiment, the user's mobile communications device may be operated as a beacon generating device while a beacon device, or more generally, a client computing device such as the event organizer device, may be configured to listen for and process the generated beacon signal as described above to initiate a programmed response.

Figure 7A:
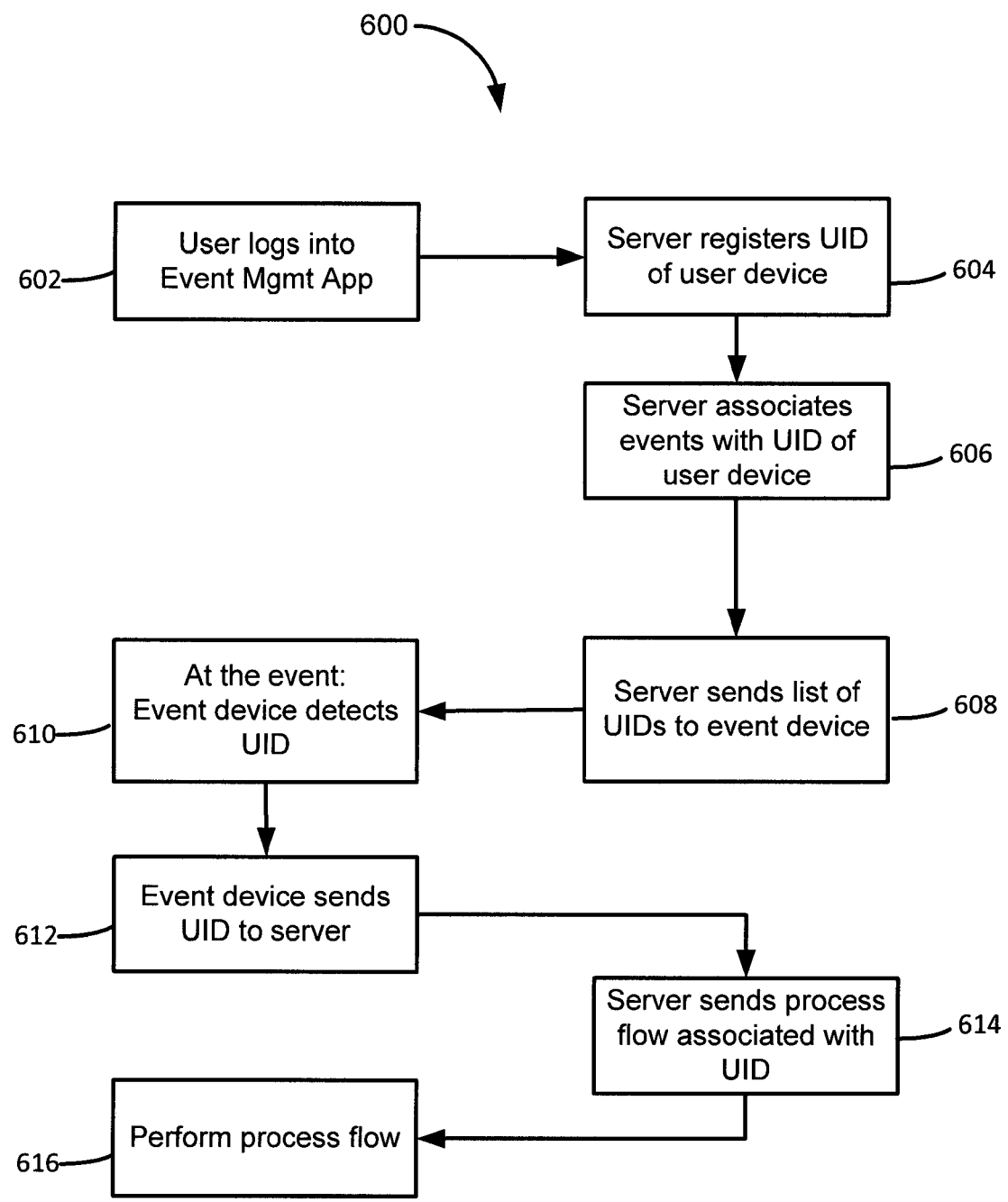
FIG. 7A is a flow diagram illustrating a process for detecting and acting on a unique identifier generated as a beacon by a user device.

For example, a process 600 for using the user device as a beacon generating device is illustrated in FIG. 7A. In step 602, a user logs into the event management application on the cloud-based server with the user's credential, such as login ID and password. In step 604, while the user device is logged into the event management application, the UID of the user device is registered with the event management application on the server. Typically, the registration of the user device UID with the event management application on the server takes place automatically in accord with the configuration of the event management application. Thus, the user is ordinarily not required to manually register his device with the server. The registration may take place well before an event, for example, when the user purchases a ticket to the event with the event management application or when the user responds to a question on the event management application soliciting the UID.

In step 606, the event management application associates any events for which the user has registered or purchased tickets with the user device UID on the event management server, and the registration or purchased ticket is also associated with the UID of the user device. Thus, the event management application can maintain a listing for each event of all UIDs associated with users that have purchased tickets and/or registered for that event. In step 608, the server can download the listing of all UIDs having tickets and/or registrations for a specific event to the event organizer device that is present at the event location so that the event organizer device knows which UIDs to listen for at the event. In step 610, the event organizer device detects the transmission of one or more UIDs at the event location. In step 612, the event organizer device sends the one or more detected UIDs to the server, or looks up the UIDs in the downloaded list. In step 614, the server or event organizer device retrieves a process flow associated with each specific UID and sends the respective process flows either back to the event organizer device, or alternatively, directly to the user device. In step 616, the process flow is performed. Usually, the process flow involves one or more interactions of data and instructions communicated between the user device and/or the event device and/or the server.

Figure 7B:
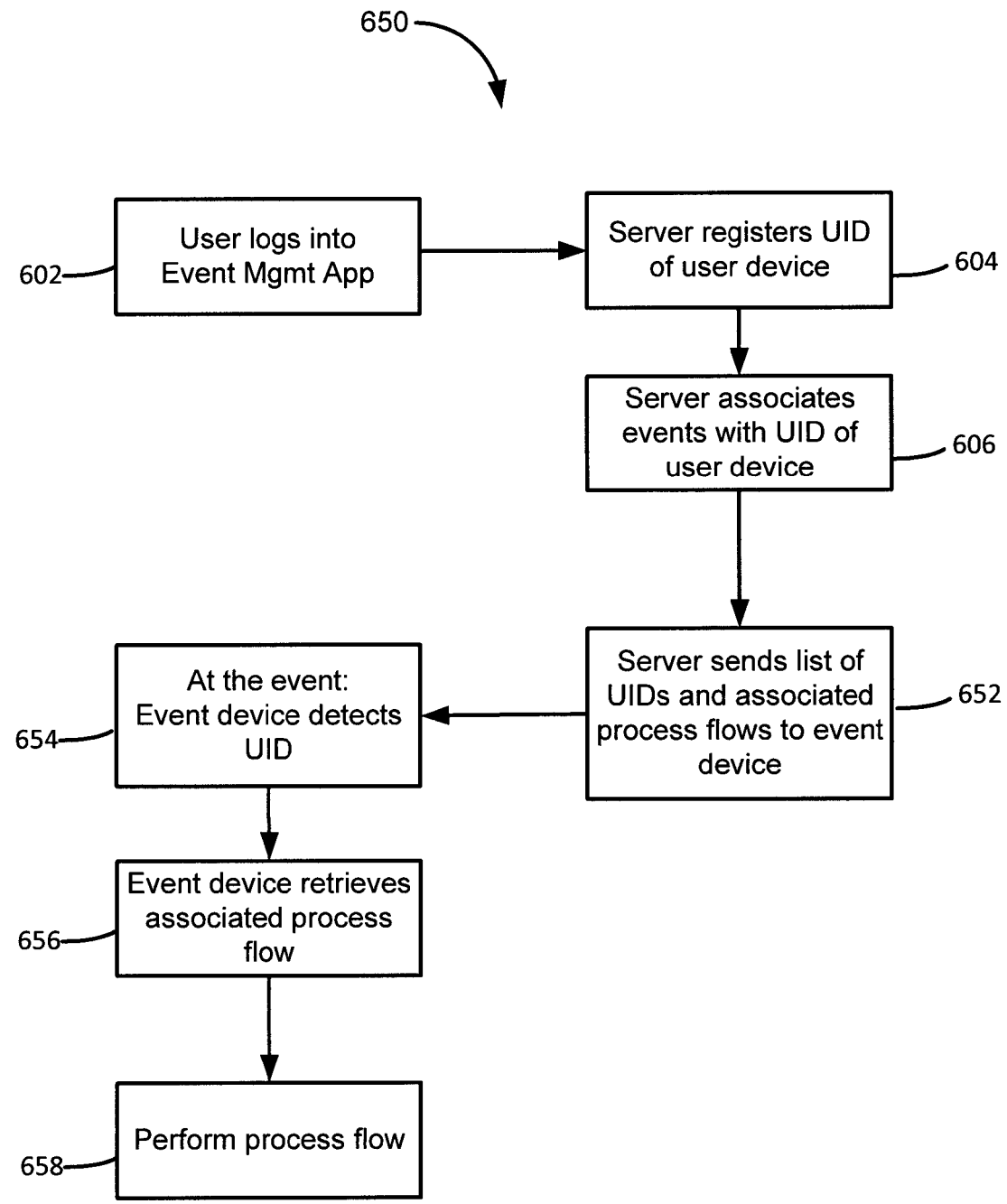
FIG. 7B is a flow diagram illustrating an alternative process for detecting and acting on a unique identifier generated as a beacon by a user device.

Another process 650 for using the user device as a beacon generating device is illustrated in FIG. 7B. Steps 602, 604 and 606 are the same as in FIG. 7. In step 652, the server downloads not only the listing of all UIDs having tickets and/or registrations for a specific event to an event organizer device at the event location, but also the process flows that are associated with each UID, and the UIDs and process flows are stored (at least temporarily) on the event organizer device or associated storage. In step 654, the event organizer device detects the transmission of a UID at the event location. In step 656, the event organizer device retrieves the process flows associated with the detected UID from storage, and in step 658, the process flow is performed.

In general, the process flow may be any event-related task. For example, the process flow may enable a check-in procedure for the user, or may enable the user to purchase a ticket and/or register for the event, or may enable the user to purchase merchandise and/or concessions at the event, or may initiate a customer service interaction, among other tasks.

In one embodiment, a beacon could be placed within a kiosk that would otherwise be used to conduct ticket sales at the event. The beacon could be limited to a certain broadcast range, such as within a circle centered on the kiosk. A sign could indicate an action required by prospective purchasers, such as "Step In To Purchase." The prospective purchaser would then trigger the transmission or reception of a particular purchase beacon by following such directions. The purchaser would then receive an event related process flow related to purchasing tickets (or other goods or services) via the process described in more detail above. The effect would be to greatly reduce lines and congestion at key locations within an event.

In one embodiment, a user with a valid ticket can simply walk through a gate at the event, and the event device, having already detected the beacon transmission with the UID of the user's device, automatically validates the ticket and checks the user into the event without any further action on the user's part.

In another example, when the event device detects the UID of the user device, the event device initiates a process flow for a check-in procedure that may be downloaded directly to the user device from the server or from the event device. The process flow may automatically display the user's ticket, or more typically, to avoid interrupting something that the user is doing with his device, such as a telephone call or browsing the internet, a notification is presented to the user device. For example, the notification may be a pop-up message displayed on the home screen of the user device that says "slide to display ticket" or "slide to view check-in options" or other similar messages.

Numerous different event-related flows and actions can be initiated as a result of strategically placing one or more beacon devices at an event location to either transmit a UID or listen for other device UIDs. For example, the beacons may be associated with specific process flows that can be delivered to the user's device and/or the event organizer device and that are directed to the following features: (i) allowing the user to purchase tickets electronically using a mobile communications device; (ii) checking the user in at the event; (iii) validating the user's ticket; (iv) providing directions to seating, concessions, and other facilities at the event; (v) providing information and/or coupons for concessions and other merchandise at the event; (vi) providing the ability for a user to purchase concessions and other merchandise at the event using electronic payment methods with a mobile communications device; (vii) providing the ability to upgrade access level or assigned seats. Many other event-related features can be provided through appropriate instructions and process flows.

5. Exemplary Hardware Architecture

Figure 8:
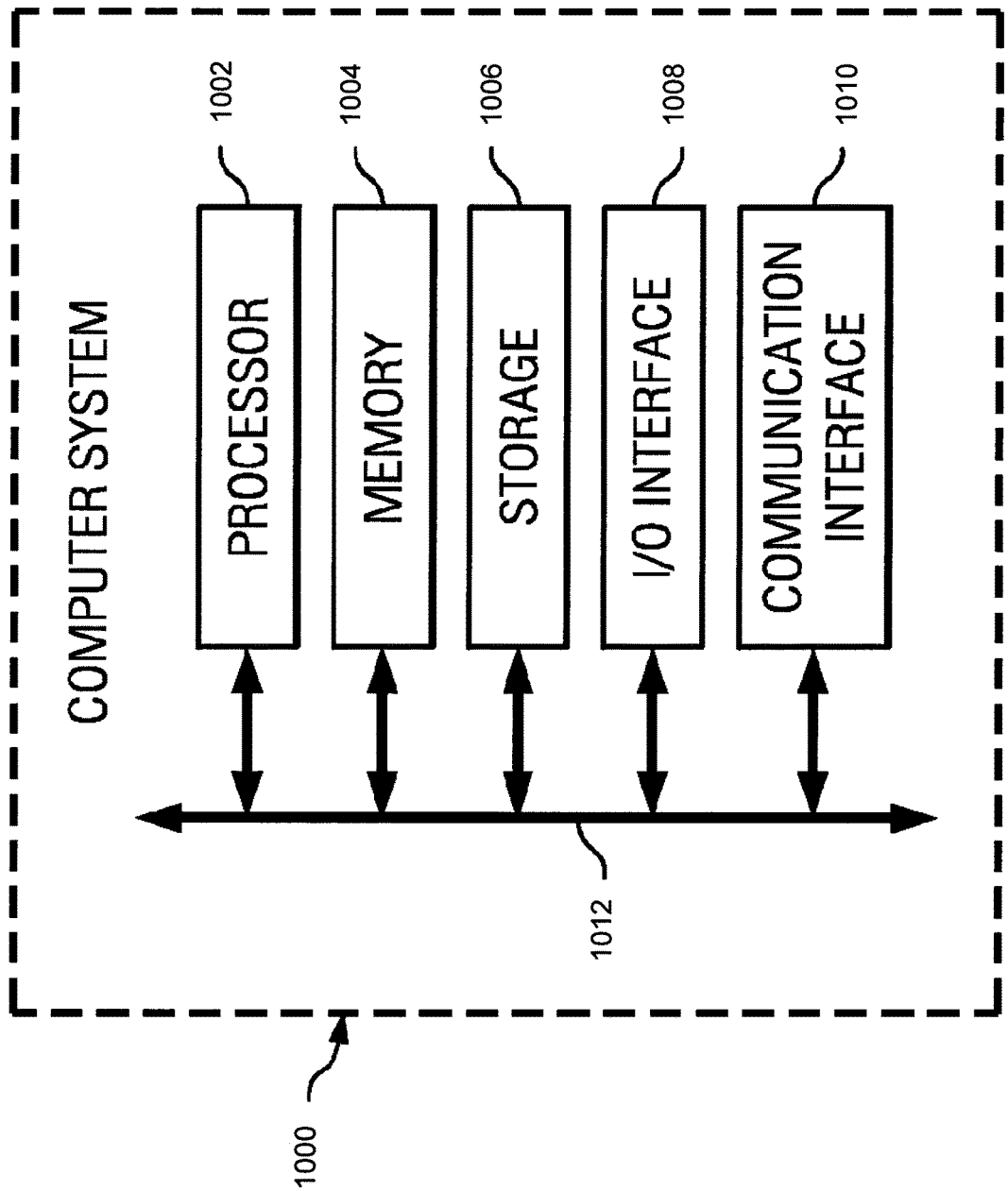
FIG. 8 is a block diagram illustrating one embodiment of a computing system implemented as an event management system.

FIG. 8 illustrates one example of a computer system 1000 for performing one or more steps of one or more methods described or illustrated herein. Reference herein to a computer system may include any type of computing device, or may include one or more computer systems, where appropriate.

The computer system 1000 may take any suitable physical form. As one example, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems; be unitary or distributed; span multiple locations; span multiple machines; span multiple data centers; or reside in a cloud, which may include one or more cloud components in one or more networks. Further, one or more computer systems 1000 may perform the steps or methods at different times or at different locations, where appropriate.

In one embodiment, the computer system 1000 includes a processor 1002, memory 1004, storage 1006, an input/output (I/O) interface 1008, a communication interface 1010, and a bus 1012. However, this disclosure contemplates any suitable computer system having any number of any relevant components in an effective arrangement.

Processor 1002 may include hardware for executing instructions, such as those making up a computer program. In order to execute instructions, the processor 1002 may retrieve (or fetch) the instructions from an internal register, an internal cache, memory 1004, or storage 1006; decode and execute them; and then write one or more results to an internal register, an internal cache, memory 1004, or storage 1006. Processor 1002 may include one or more internal caches for data, instructions, or addresses. The processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002.

The processor 1002 may include one or more internal registers for data, instructions, or addresses. Where appropriate, processor 1002 may include one or more arithmetic logic units (ALUs); be a multi-core processor; or include one or more processors.

Memory 1004 includes main memory for storing instructions for processor 1002 to execute or data for the processor to operate on. Computer system 1000 may load instructions from storage 1006 or another source (such as, for example, another computer system) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004.

Processor 1002 executes only instructions or data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below.

One or more memory management units (MMUs) may reside between processor 1002 and memory 1004 and facilitate access to memory 1004 requested by the processor. Memory 1004 may include random access memory (RAM), which may be volatile memory, dynamic RAM (DRAM) or static RAM (SRAM). Moreover, where appropriate, this RAM may be single-ported or multi-ported RAM.

Storage 1006 may include mass storage for data or instructions. Storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. Storage 1006 may be non-volatile, solid-state memory, read-only memory (ROM), mask-programmed ROM, programmable ROM (PROM), erasable PROM (EPROM), electrically erasable PROM (EEPROM), electrically alterable ROM (EAROM), or flash memory or a combination of two or more of these. Storage 1006 may include one or more storage control units facilitating communication between processor 1002 and the storage, where appropriate.

I/O interface 1008 includes hardware, software, or both, providing one or more interfaces for communication between computer system 1000 and one or more I/O devices. Computer system 1000 may include one or more of these I/O devices, where appropriate, to enable communication between a user and the computer system. An I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. I/O interface 1008 may include one or more device or software drivers enabling processor 1002 to drive one or more of these I/O devices.

Communication interface 1010 may include hardware, software, or both providing one or more interfaces for communication (such as, for example, packet-based communication) between computer system 1000 and one or more other computer systems or one or more networks. Communication interface 1010 may include a network interface controller (NIC) or network adapter for communicating with an Ethernet or other wire-based network or a wireless NIC (WNIC) or wireless adapter for communicating with a wireless network, such as a WI-FI network. Computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. Computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

Bus 1012 may include hardware, software, or both coupling components of computer system 1000 to each other. Bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these.

A non-transitory computer-readable storage medium may include one or more semiconductor-based or other integrated circuits (ICs) (such, as for example, field-programmable gate arrays (FPGAs) or application-specific Ics (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable non-transitory computer-readable storage media, or any suitable combination of two or more of these, where appropriate. A computer-readable non-transitory storage medium may be volatile, non-volatile, or a combination of volatile and non-volatile, where appropriate.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates herein components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:

1. A method comprising:
receiving, at a first server running an event management application, from a first client computing device associated with a first user, a first unique identifier associated with a first check-in device located proximate to a main entrance of a venue for an event, the first check-in device periodically transmits the first unique identifier;
retrieving, by the first server from data storage accessible to the first server, server information concerning a first check-in process for the main entrance that is associated with the received first unique identifier;
sending, by the first server to one of the first client computing device or the first check-in device, a first portion of the retrieved server information including first program instructions for initiating the first check-in process;
receiving, by the first server from the first client computing device in response to execution of the first program instructions, a first ticket identifier associated with the first user;
determining, by the first server, that the received first ticket identifier is valid and permits access to the main entrance of the venue and at least one secondary area of the venue;
sending, by the first server to one of the first client computing device or the first check-in device, a second portion of the retrieved server information including second program instructions to enable entry by the first user at the main entrance;
receiving, at the first server from the first client computing device after entry to the main entrance, a second unique identifier associated with a second check-in device located at the at least one secondary area, the second check-in device periodically transmits the second unique identifier;
identifying, by the first server, a second check-in process for the at least one secondary area that is associated with the received second unique identifier;
retrieving, by the first server from data storage, server information concerning the second check-in process;
sending, by the first server to one of the first client computing device or the second check-in device, a first portion of the retrieved server information concerning the second check-in process including third program instructions for initiating the second check-in process for checking the first user into the at least one secondary area;
receiving, by the first server from the first client computing device in response to execution of the third program instructions, the first ticket identifier;
determining, by the first server, that the received first ticket identifier permits access to the at least one secondary area of the venue;
sending, by the first server to one of the first client computing device or the second check-in device, a second portion of the retrieved server information concerning the second check-in process including fourth program instructions to enable access to the at least one secondary area.

2. The method of claim 1, further comprising:
prior to the step of retrieving server information concerning the first check-in process, sending a notification from the first server to the first client computing device requesting a reply from the first client computing device confirming that the first server should send the server information concerning the first check-in process to the first client computing device; and
upon receiving the reply from the first client computing device confirming that the first server should send the server information, completing the steps of retrieving and sending the first portion of the server information to the first client computing device.

3. The method of claim 1, wherein the first client computing device is a mobile communications device and the first check-in device includes a beacon generating device.

4. The method of claim 3, the step of retrieving server information concerning the first check-in process further comprising providing a known location of at least one beacon generating device that is registered with the first server and that is located proximate to the mobile communications device.

5. The method of claim 3, the step of retrieving server information concerning the first check-in process further comprising identifying at least one beacon generating device associated with the event and identifying at least one prior transaction involving the mobile communications device at the event.

6. The method of claim 1, further comprising:
retrieving a payment credential associated with the received unique identifier; and
completing a purchase transaction for goods or services at the event using the payment credential.

7. The method of claim 1, further comprising:
retrieving an event profile for the event; and
associating the retrieved event profile with the received unique identifier.

8. A method comprising:
receiving, at a first server running an event management application from a mobile communications device, a first unique identifier associated with a first beacon generating device located at an event;
retrieving, by the first server from data storage accessible to the first server, server information including first program instructions for enabling a first check-in process that is associated with the first unique identifier;
sending, by the first server to the mobile communications device, the first program instructions;
receiving, by the first server from the mobile communications device in response to execution of the first program instructions, a ticket identifier;
determining that the ticket identifier is valid for entry to the event;
sending, by the first server to the mobile communications device, second program instructions of the retrieved server information, the second program instructions enabling entry to the event
receiving, at the first server from the mobile communications device after entry to the event, a second unique identifier associated with a second beacon generating device located at a secondary area of the event;
retrieving, by the first server from the data storage, third program instructions for enabling entry to the secondary area of the event;
sending, by the first server to the mobile communications device, the third program instructions;
receiving, by the first server from the mobile communications device in response to execution of the third program instructions, the ticket identifier;
determining that the ticket identifier is valid for entry to the secondary area; and
sending, by the first server to the mobile communications device, fourth program instructions enabling entry to the secondary area.

9. An event management system, comprising:
a first beacon generating device located at a first area of an event venue, the first beacon generating device periodically transmitting a first unique identifier;
a second beacon generating device located at a second area of the event venue, the second beacon generating device periodically transmitting a second unique identifier;
at least one processor running an event management application; and
a memory coupled to the processor comprising instructions executable by the processor, the instructions, when executed by the processor, cause the processor to:
receive, from a mobile communications device of a user, the first unique identifier associated with the first beacon generating device;
send to one of the first beacon generating device or the mobile communications device for execution, a first set of instructions for initiating a first check-in process with the first beacon generating device at the first area of the event venue using the user's mobile communications device;
receive, the mobile communications device in response to execution of the first set of instructions, an identifier associated with the user of the mobile communications device;
determine that the identifier is valid for access to the first area of the event venue;
send, to one of the mobile communications device or the first beacon generating device, a second set of program instructions for enabling the first check-in process to grant access to the user at the first area;
receive, from the mobile communications device, the second unique identifier associated with the second beacon generating device;
send, to one of the second beacon generating device or the mobile communications device for execution, a third set of instructions for initiating a second check-in process with the second beacon generating device at the second area of the event venue using the user's mobile communications device;
receive, from the mobile communications device in response to execution of the third set of instructions, the user identifier;
determine that the user identifier is valid for access to the second area of the event venue;
send, to one of the mobile communications device or the first beacon generating device, a fourth set of program instructions for enabling the second check-in process to grant access to the user at the second area.

10. A method for a server running an event management application, comprising:
receiving, from a first client computing device associated with a first user, a first unique identifier associated with a first event device located at a first area of an event venue, the first event device periodically transmits the first unique identifier;
retrieving a first set of instructions associated with the first unique identifier, the first set of instructions configured for obtaining authorization to access the first area of the event venue, and sending the first set of instructions to one of the first client computing device or the first event device;
receiving, from the first client computing device after execution of the first set of instructions by one of the first client computing device or the first event device, a first ticket identifier;
comparing the first ticket identifier to a list of valid ticket identifiers for the first area;
upon confirming the first ticket identifier is on the list of valid ticket identifiers for the first area, retrieving a second set of instructions associated with the second unique identifier, the second set of instructions configured for granting access to the first area, and sending the second set of instructions to the first event device to enable granting access to the first area for the first user;
receiving, from the first client computing device after entry to the first area, a second unique identifier associated with a second event device located at a second area of the event venue, the second event device periodically transmits the second unique identifier;
retrieving a third set of instructions associated with the second unique identifier, the third set of instructions configured for obtaining authorization to access the second area of the event venue, and sending the third set of instructions to one of the first client computing device or the second event device;
receiving, from the first client computing device after execution of the third set of instructions by one of the first client computing device or the second event device, the first ticket identifier;
comparing the first ticket identifier to a list of valid ticket identifiers for the second area;

upon confirming the first ticket identifier is on the list of valid ticket identifiers for the second area, retrieving a fourth set of instructions associated with the second unique identifier, the fourth set of instructions configured for granting access to the second area, and sending the fourth set of instructions to the first event device to enable granting access to the second area for the first user.

* * * * *